United States Patent
Kozaki et al.

[11] Patent Number: 5,828,888
[45] Date of Patent: Oct. 27, 1998

[54] COMPUTER NETWORK HAVING OS-VERSIONS MANAGEMENT TABLE TO INITIATE NETWORK BOOT PROCESS VIA MASTER COMPUTER

[75] Inventors: Mitsuyoshi Kozaki; Kiyohiko Yoshida, both of Tokyo, Japan

[73] Assignee: NEC Corporation, Tokyo, Japan

[21] Appl. No.: 690,167

[22] Filed: Jul. 26, 1996

[30] Foreign Application Priority Data

Jul. 26, 1995 [JP] Japan ..................... 7-190318

[51] Int. Cl.⁶ .......................................... G06F 9/06
[52] U.S. Cl. .................................. 395/712; 395/652
[58] Field of Search ............................ 395/712, 651, 395/652, 653, 680, 682

[56] References Cited

U.S. PATENT DOCUMENTS

| | | | |
|---|---|---|---|
| 4,888,683 | 12/1989 | Koizumi et al. | 395/652 |
| 5,367,688 | 11/1994 | Croll | 395/652 |
| 5,404,527 | 4/1995 | Irwin et al. | 395/652 |
| 5,450,576 | 9/1995 | Kennedy | 395/652 |
| 5,659,748 | 8/1997 | Kennedy | 395/652 |

Primary Examiner—Kevin A. Kriess
Attorney, Agent, or Firm—Foley & Lardner

[57] ABSTRACT

In a computer network, a master computer has an operating system (OS) management table for mapping unique addresses of the network computers to respective versions of an operating system and a status table for mapping the unique addresses to respective busy/idle states of the computers and to respective queues. A list of the OS versions is retrieved from the management table to allow user at a source computer to select one of the versions, and a request is sent to the master computer. In response, the master computer makes a search through the management table for remote computers in which the operating system of the selected version is installed and makes a search through the status table to determine their busy/idle states and to detect one of their queues having shortest length if all of the remote computers are busy. The request from the source computer is stored into the shortest length queue and a network boot command signal is sent from the master computer to the remote computer of the shortest length queue when it receives therefrom a network boot complete message upon completion of a network boot process on an older request in the shortest length queue. The remote computer of the shortest queue length responds to eachp network boot command signal by transmitting a copy of the selected version of the operating system to the source computer.

8 Claims, 5 Drawing Sheets

NETWORK BOOT REQUEST MESSAGE (M3)

| SOURCE COMPUTER ADDRESS | USER-ENTERED OS VERSION NO. | TIME OF DAY |
|---|---|---|

REMOTE COMPUTER

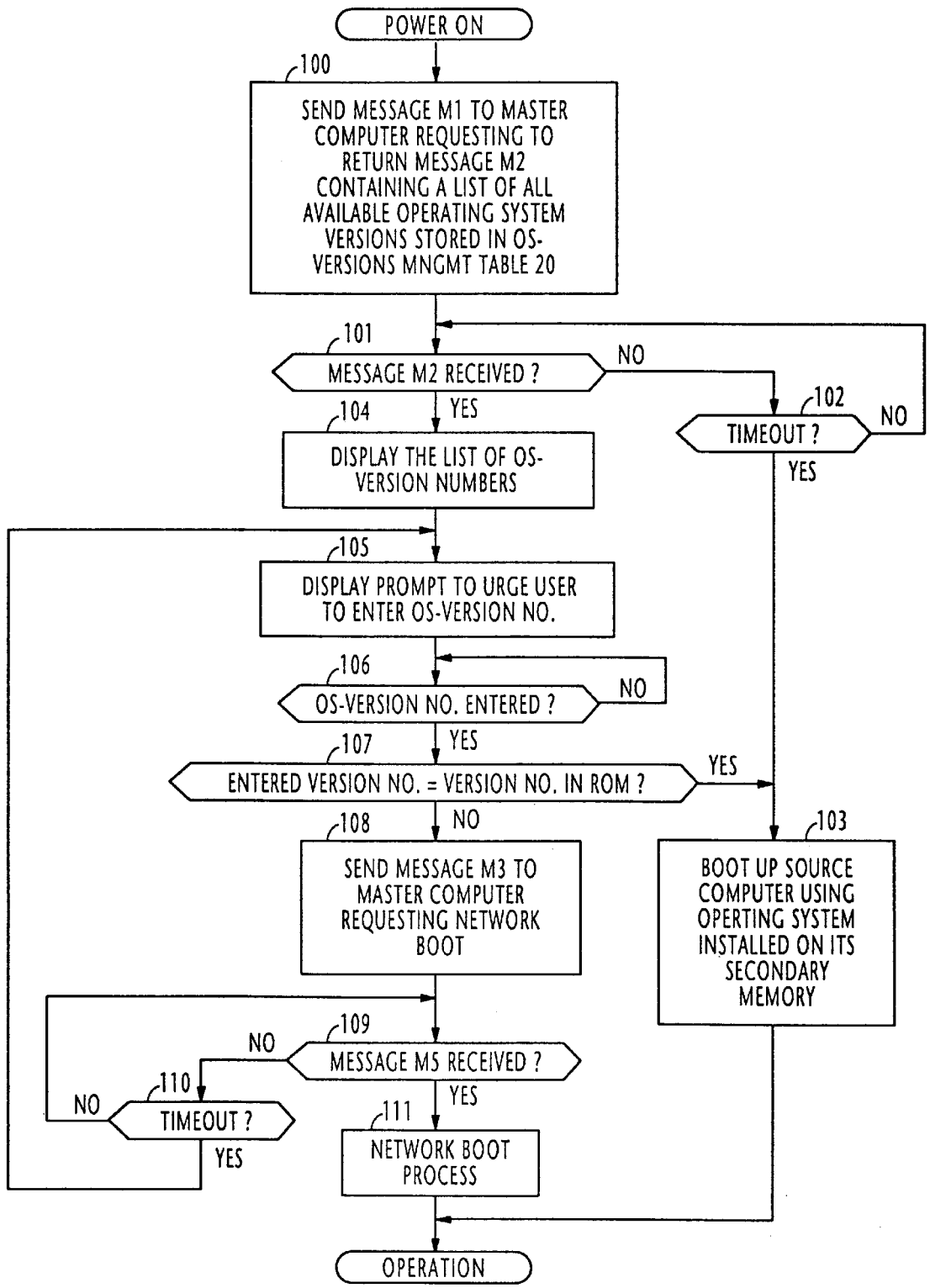

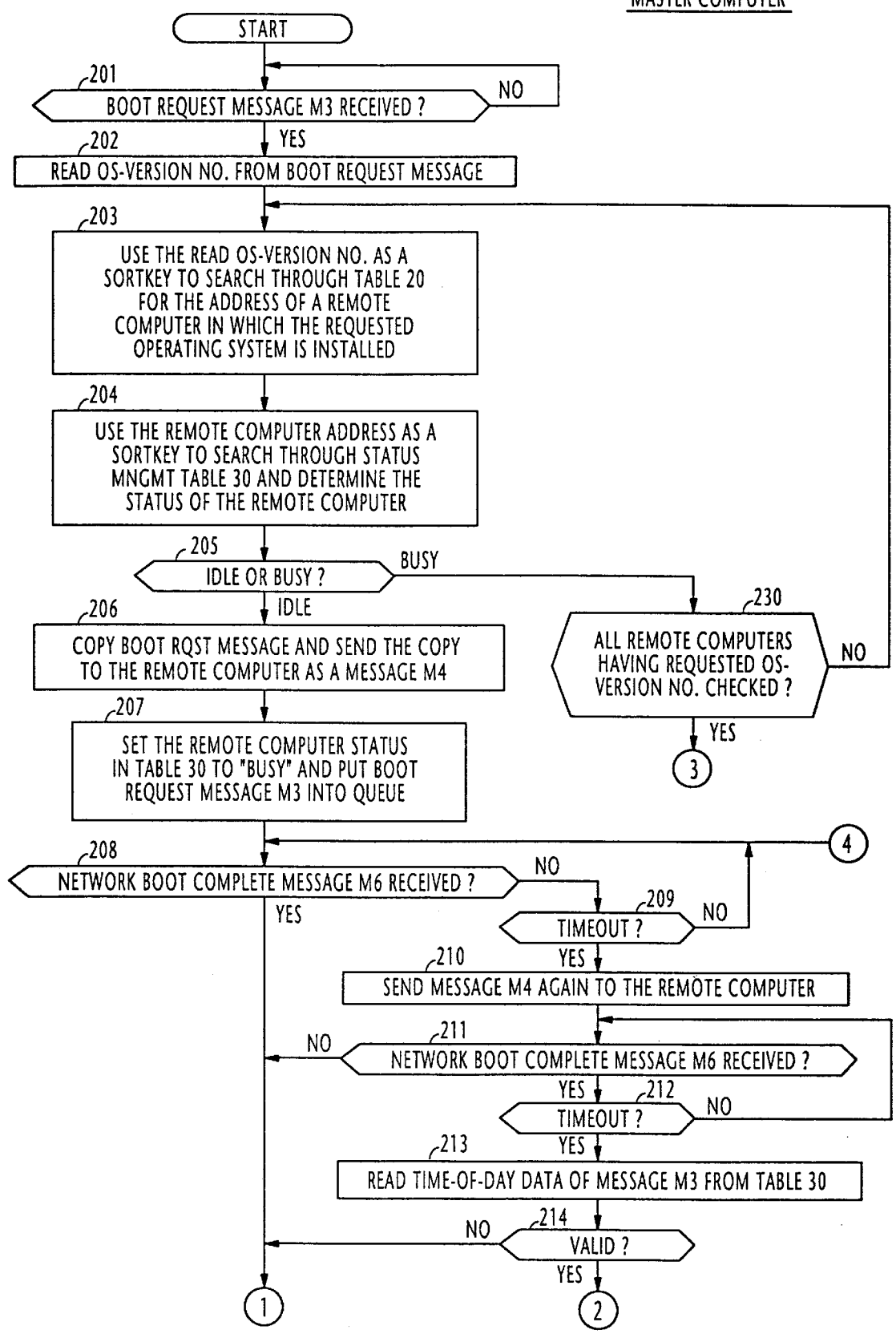

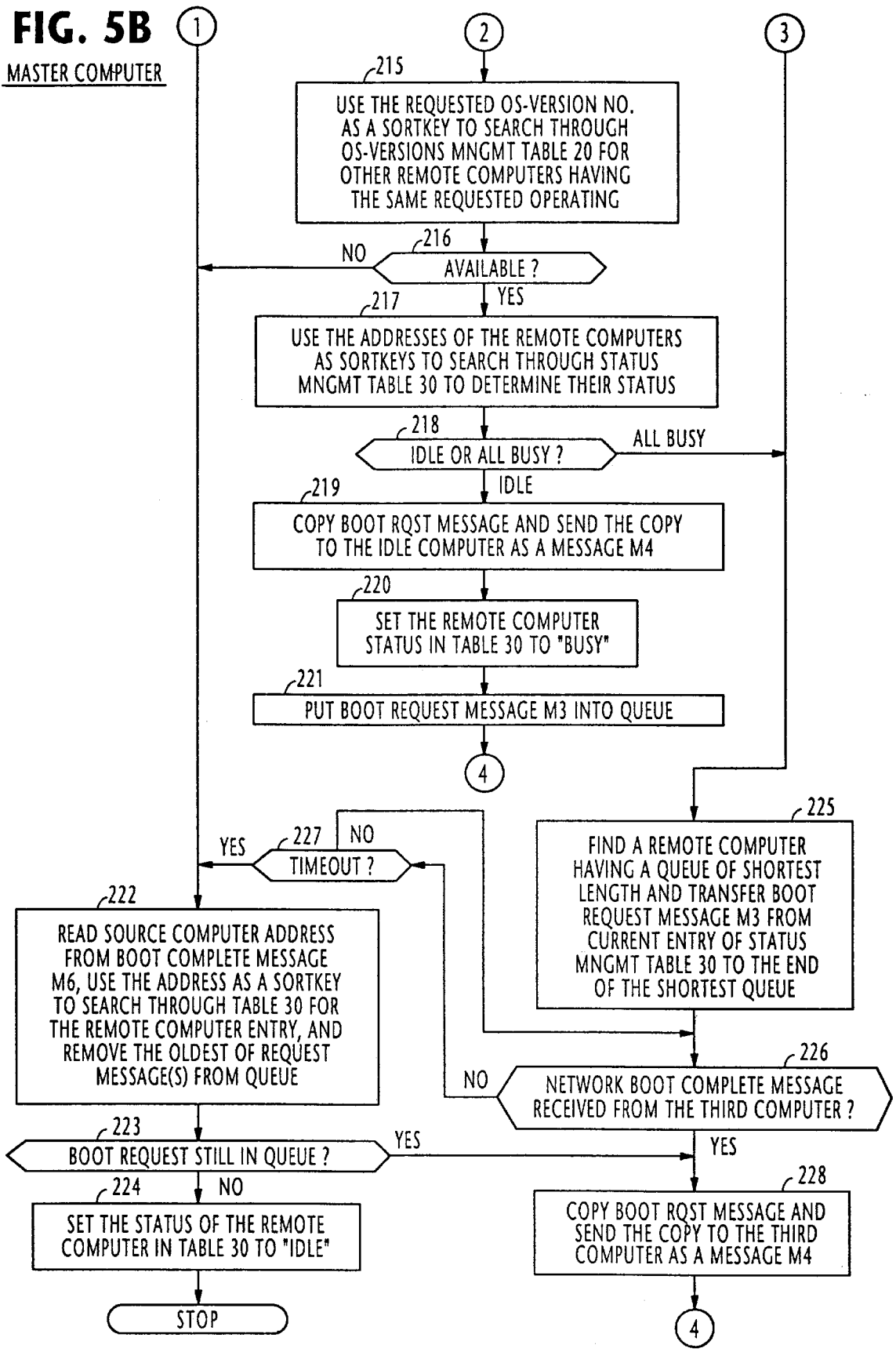

COMPUTER NETWORK HAVING OS-VERSIONS MANAGEMENT TABLE TO INITIATE NETWORK BOOT PROCESS VIA MASTER COMPUTER

BACKGROUND OF THE INVENTION

1. Field of the Invention

The present invention relates generally to computer networks, and more particularly to a computer network wherein individual computers use different versions of an operating system (OS) and wherein each computer uses a network boot process to receive a desired OS version from other computers if it is not installed in the computer.

2. Description of the Related Art

In computer networks, different versions of an operating system (OS) are used to meet the individual needs of the host computers of the network. In the past, the individual host computers were responsible for the management of their OS versions by installing them in a secondary memory and specifying one of the stored OS versions when each computer is started. In order to improve the utilization efficiency of the secondary memories of the network, a network boor process has been developed to enable the transfer of a copy of desired OS version from one computer to another. To provide a network boot process in a computer it is necessary to store network addresses of the computers in the involatile memory (ROM) of the computer to enable it to uniquely identify remote computers of the network and the user at the computer provides an interactive setting to the network boot process whenever the computer is started so that it can be accessed from the other computers of the network.

However, when the number of different OS versions increases, the network address information in the involatile memory must be updated using a complex setting procedure. One solution would be to install all OS versions of the network into the involatile memory of each computer in addition to the network addresses. However, the stored versions must be updated in each computer whenever the operating system is upgraded. In addition, there is a possibility that more than one source computer simultaneously accesses a remote computer even though other remote computers are available. Under such circumstances, since a network boot proceeds one at a time for each request, a substantial amount of time is taken to boot up the source computer. In addition, a network computer may be shutdown for an extended period of time for maintenance purposes. When this occurs, a source computer may repeat futile attempts before it recognizes the unavailability of the inactive computer to restart accessing other computers.

SUMMARY OF THE INVENTION

It is therefore an object of the present invention to achieve efficient utilization of the resources of a computer network which uses different versions of an operating system ad quick notification of latest versions of the operating system to all the network computers.

According to a broader aspect, the present invention provides a computer network comprising a plurality of computers respectively identified by unique addresses and interconnected by a network, one of the computers being a master computer having an operating system (OS) management table for mapping the unique addresses to respective versions of an operating system. Each computer of the network is responsive to a network boot command signal for performing a network boot process to a source computer by transmitting thereto a copy of one of the versions of the operating system, and retrieving a list of the operating system versions from the OS management table to allow a user at the source computer to select one of the versions from the list when functioning as the source computer and transmitting a request to the master computer indicating the selected version the master computer is responsive to the request from the source computer for transmitting the network boot command signal to a third computer in which the selected version of the operating system is installed so that the third computer performs a network boot process by transmitting a copy of the selected version of the operating system to said source computer.

Therefore, the provision of the OS management table at the master computer allows all the other computers of the network to look into the latest versions of the operating system and reduces their tasks of booting their computers to the issuance of a network boot request only to the central location (i.e., master computer).

A further advance is attained by the arrangement in which the third computer transmits a network boot complete message to the master computer upon completion of a network boot process, and a status table is provided in the master computer for mapping the unique addresses to respective busy/idle states of the computers and to respective queues. The master computer stores a request from the source computer into the queue of the third computer prior to the transmission of the network boot command signal, making a search through the OS management table for a plurality of remote computers in which the operating system of the selected version is installed if the network boot complete message is not returned from the third computer within a specified time interval, making a search through the status table to determine the busy/idle states of the plurality of remote computers and to detect one of the queues of the plurality of remote computers whose length is shortest if all of the plurality of remote computers are determined to be in a busy state, transferring the request to the queue of the shortest length, and transmitting the network boot command signal to the computer of the shortest length queue when the master computer receives therefrom a network boot complete message upon completion of a network boot process performed on a request waiting in a position of the shortest length queue preceding a position to which the request is transferred.

Therefore, if a requested OS version is installed in a plurality of computers, they take turns to serve the request. If one of these computers is rendered inactive for maintenance purposes, the request is automatically served by the rest of the computers.

According to a second aspect, the present invention provides a computer network comprising a plurality of computers respectively identified by unique addresses and interconnected by a network, one of the computers being a master computer having an operating system (OS) management table for mapping the unique addresses to respective versions of an operating system and a status table for mapping the unique addresses to respective busy/idle states of the computers and to respective queues. Each of the computers is responsive to a network boot command signal for performing a network boot process to a source computer by transmitting thereto a copy of one of the operating systems, transmitting a network boot complete message to the master computer upon completion of the network boot process, retrieving a list of the operating system versions from the OS management table to allow a user to select one of the versions from the list, and transmitting a request to the master computer indicating the selected version when functioning as the source computer. The master computer is responsive to the request for making a search through the OS management table for a plurality of remote computers in which the operating system of the selected version is installed, making a search through the status table to determine the busy/idle states of the remote computers and to detect one of the queues of the remote computers whose length is shortest if all of the remote computers are determined to be in a busy state, storing the request into the queue of the shortest length, and transmitting said network boot command signal indicating the selected version to the remote computer of the shortest length queue when the master computer receives a network boot complete message therefrom upon completion of a network boot process performed by the remote computer on an older request in the shortest length queue.

BRIEF DESCRIPTION OF THE DRAWINGS

The present invention will be described in further detail with reference to the accompanying drawings, in which:

FIG. 2 is a sequence diagram showing a typical case of transferring an operating system using one of the computers as a master computer;

FIG. 4 is a flowchart of operations performed by the source computer;

FIGS. 5A and 5B are flowcharts of operations performed by the master computer.

DETAILED DESCRIPTION

Figure 1:
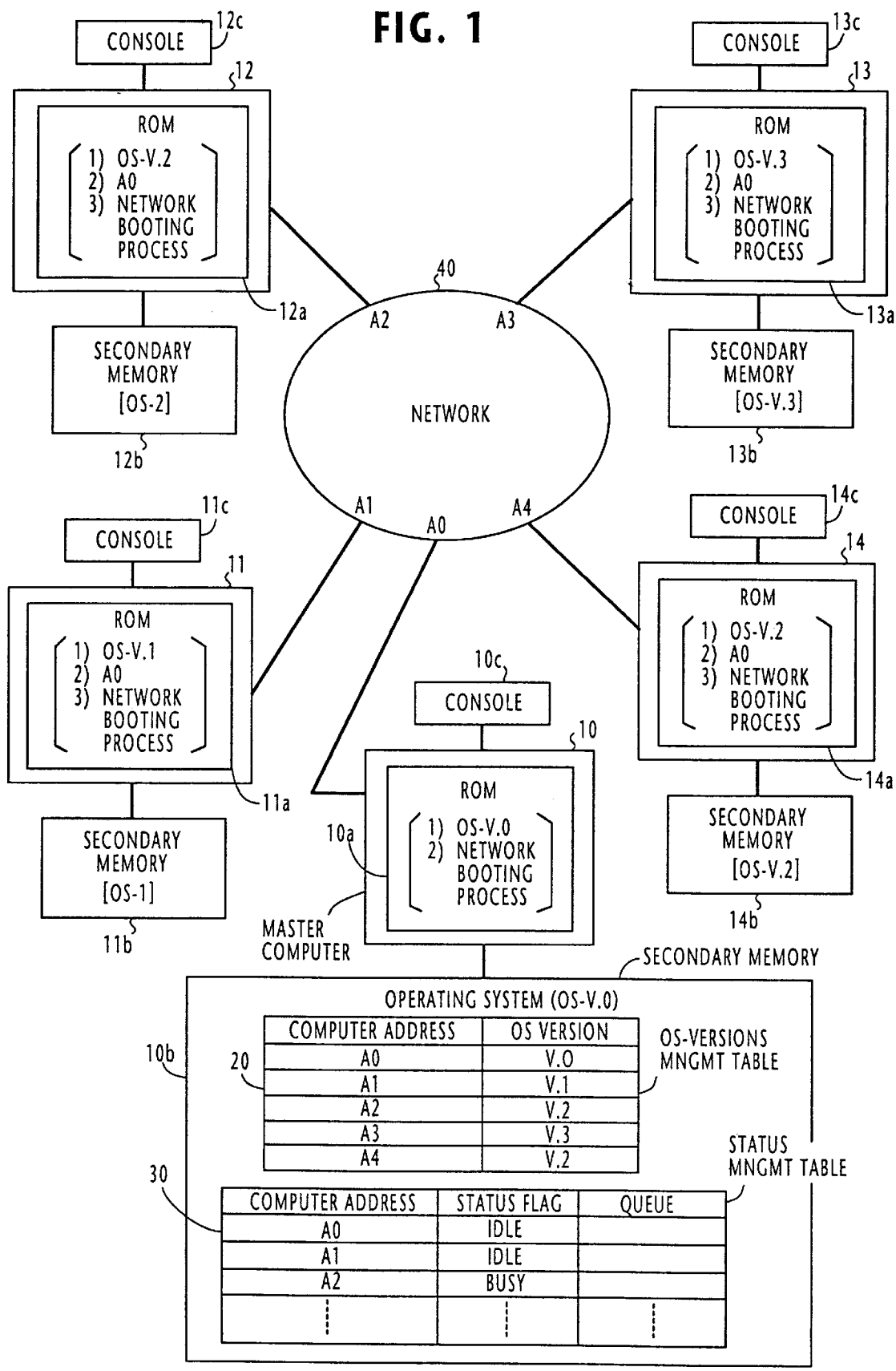
FIG. 1 is a block diagram of a computer network incorporating the operating system transfer control according to the present invention.

Referring now to FIG. 1, a computer network of the present invention is formed by host computers 10 to 14 interconnected by a network 40. Host computers 10 to 14 are identified by unique network addresses A0 to A4, respectively, and include read-only memories 10a–14a, in each of which the version number of the operating system used by the respective computer is stored in addition to a network boot process with which a copy of a desired version of the operating system can be transferred from another computer of the network. Host computer 10 is a master computer which differs from the other computers by the provision of an operating-system versions management table 20 and a status management table 30 in a hard disk, or secondary memory 10b. For network booting, the ROMs of non-master computers 11–14 store the network address A0 of the master computer 10. The versions of the operating systems used in the computer network may be different among a certain group of host computers and may be the same among another group. As a typical example, different versions of operating systems are shown installed in host computers 10, 11, 12 and 13, i.e., versions V.0, V.1 and V.3, respectively, and the same version V.2 is shown installed in computers 12 and 14. Consoles 10c–14c are provided for manual access to the respective host computers to display a list or OS versions on a video screen for entry of a desired OS version number.

The operating-system versions management table 20 defines a map between computer addresses A0 to A4 and the versions of the operating systems installed in corresponding computers 10–14. the status management table 30 provides mapping between the computer addresses A0–A4, busy/idle status of the corresponding computers, and queue entries for storing boot request messages from source computers. If there is more than one network boot request for a given entry, the requests are served on a first-in-first-served basis.

Figure 3:
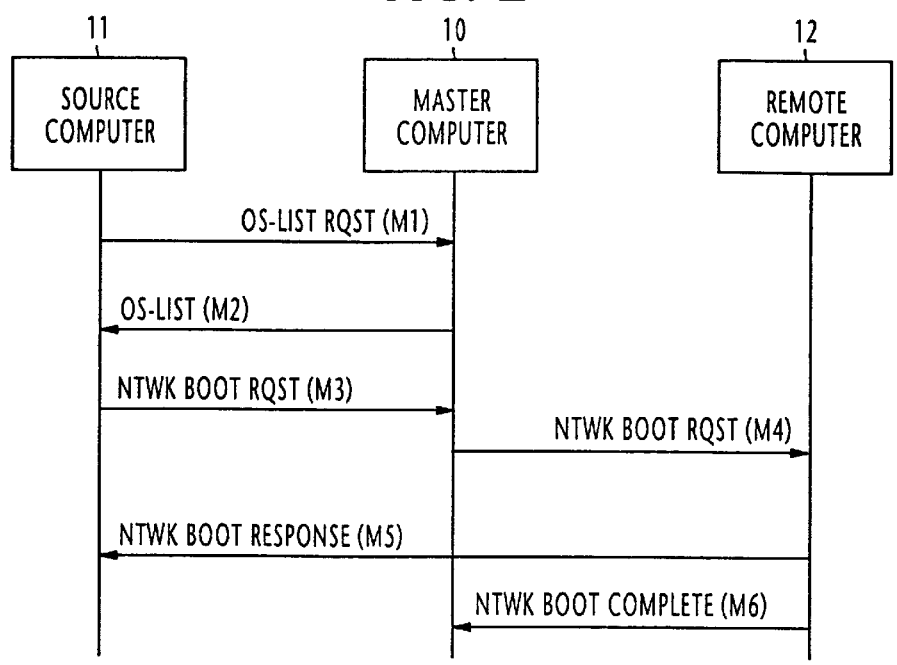
FIG. 3 shows a data structure of a network boot request message transmitted from a source computer.

Before going into details of the present invention, the types of message to be used will be explained with reference to a sequence diagram shown in FIG. 2 by assuming that host computer 10 is a source computer which issues a message for requesting a network boot and host computer 12 is a remote computer in which the version of operating system requested by the source computer is installed. Source computer 11 initially sends a request message M1 to master computer 10, requesting a list of all operating system versions stored in the table 20. In response, a message M2 containing the list is sent from master computer 10 to source computer 11. The list of OS versions contained in the message M2 is displayed and one of the OS versions is selected by the user at the source computer 11. The version number of the selected operating system is entered through console 11c and a network boot request message M3 is produced. A s shown in FIG. 3, the network boor request message M3 contains the source computer address (in this case, A1), the entered OS version number and time-of-day data. The network boot request message M3 is sent to master computer 10 where it is copied and sent to the remote computer 12 as a message M4. Computer 12 returns a network boot response message M5 by sending a copy of the requested operating system to the source computer 11, and then a network boot complete message M6 which contains the source computer address to the master computer.

Referring to FIG. 4, the operation of the source computer 11 begins with step 100 where it sends a request message M1 to master computer 10 requesting to return a message M2 containing a list of all available OS versions stored in it OS-versions management table 20. Following the transmission of message M1, the source computer begins a timing action and loops decision steps 101 and 102. When the message M2 is not sent from the master computer 10 within the period of the timing action the decision at step 102 is affirmative, and flow proceeds to step 103 to boot up the source computer 11 using the operating system or version V.1 installed on the secondary memory 11b to start operating the computer 11.

If the master computer sends the message M2 within the period of the timing action, the decision at step 101 is affirmative, and flow proceeds to step 104 to display the list of OS versions contained in the message M2 on the console 11c. At step 105, a prompt is displayed urging the user at console 11c to select and enter a requested operating system version number. When the requested number is entered (step 106), flow proceeds to step 107 to determine whether the entered version number equals the version number stored in ROM 11a. If so, flow proceeds to step 103. If the decision is negative, flow proceeds from step 107 to step 108 to send the network boot request message M3 to the master computer 10 and wait for a network boot response message M5 by starting a timing action. Source computer 11 loops decision steps 109 and 110 to determine whether the message M5 is sent from the remote computer 12 within the period of the timing action. If the message M5 is received by source computer 11s, flow proceeds from step 109 to step 111 to boot up the source computer 11 using the requested version of the operating system transmitted from the remote computer 12. If the message M5 is not received, flow exits step 110 and returns to step 105 to display a prompt to enter a desired version of operating system to repeat the same process.

In FIG. 5A, the master computer 10 starts its network boot routine when it receives the request message M3 from the source computer 11 at step 201. At step 202, the master computer reads the requested OS version number from the received message and uses it, at step 203, as a sortkey to search through the OS-versions management table 20 for the address of a remote computer in which the operating system of the requested version number is installed. At step 204, the address of the remote computer 12 (i.e., A2) is used as a sortkey to search through the status management table 30 to determine whether the remote computer 12 is idle or busy (step 205).

If the requested operating system is installed in more than one computer as in the case of version number V.2 in computers 12 and 14, it is necessary to repeat the above process to check for the availability of another remote computer. Therefore, if the computer 12 is determined to be busy at step 205, flow proceeds to step 230 to determine whether all the computers in which the requested operating system is installed are checked for their busy/idle state. If not, flow returns from step 230 to step 203 to repeat the process.

If it is determined at step 205 that there is an idle computer in the network where the requested operating system is installed, flow proceeds to step 206 to copy the boot request message M3 and send it to the idle computer as a message M4 and begin a timing action.

Figure 6:
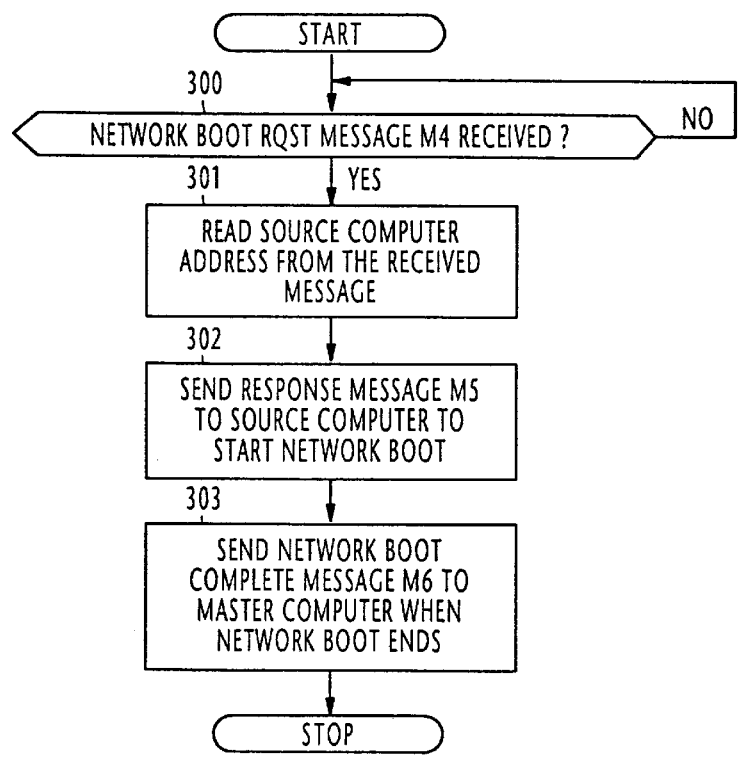
FIG. 6 is a flowchart of operations performed by a remote computer in which a requested operating system is installed.

As shown in FIG. 6, when the remote computer 12 receives the message M4 (step 300), it reads the source computer address from the message M4 (step 301), sends a response message M5 to the source computer 11 to start a network boot by transmitting a copy of the requested operating system (step 302). Upon completion of the network boot, a network boot complete message M6 is sent from computer 12 to the master computer 10 at step 303.

Returning to FIG. 5A, the master computer sets the status of remote computer 12 in the status management table 30 to "busy" at step 207 and puts the boot request message M3 into queue in the entry of computer 12. Steps 208 and 209 are looped to check to see if the network boot complete message M6 is received from the computer 12 within the period of the timing action.

If a network boot complete message M6 is received by the master computer, flow proceeds from step 208 to step 222 (FIG. 5B) to read the source computer address (i.e., A1) from the received message M6, use it as a sortkey to search through the table 30 for the corresponding entry and remove the oldest of network boot request messages M3 out of queue. At step 223, it is determined whether there is still an outstanding request in queue. If no outstanding requests are found in the queue entry of computer 12, flow proceeds from step 223 to step 224 to set the status of computer 12 in the status management table 30 to "idle" and proceeds to the end of the routine. If an outstanding request is found in the queue entry, flow proceeds from step 223 to step 228 to copy the boot request message in queue and send it to the remote computer 12 as a message M4 and begins a timing action. Flow returns to step 208 to check for the reception of a network boot complete message M6.

If the network complete message M6 is not received within the predetermined period of transmission of message M4, the decision at step 209 is affirmative and the master computer advances to step 210 to send a the message M4 again to the computer 12 and waits for a network boot complete message M6 by looping decision steps 211 and 212. If the message M6 is received, flow exits from step 211 to step 222. If the waster computer fails to receive the message M6, flow proceeds from step 212 to step 213 to read the time-of-day data of message M3 in the queue entry of computer 12 in the status management table 30. At step 214, the read time-of-day data is checked to determine whether the network boot request M3 is still valid. If the amount of time elapsed from the reception of message M3 has exceeded a critical time interval, the request is treated as invalid and flow proceeds from step 214 to step 222 to remove the request from the waiting queue.

If the network boot request M3 is determined to be valid at step 214, flow proceeds to 215 (FIG. 5B) to use the requested OS version number as a sortkey to make a search through the table 20 for other remote computers (such as computers 12 and 14) in which the requested operating system is installed. If such computers are not available, flow proceeds from step 216 to step 222, and it available, step 217 is executed by using the addresses of such computers as sortkeys to search through the status management table 30 to determine their operating state. If there is at least one idle computer, flow proceeds from step 218 to 219 to copy the boot request message and send it to the idle computer as a message M4. At step 220, the status of the computer to which the message M4 has been transmitted is changed to "busy" and the request message M3 is put into the queue entry of that computer (step 221), and flow returns to step 208.

If the decision at step 218 indicates that the available computers are all busy, or if the decision at step 230 is affirmative, flow proceeds to step 225 to find one of such computers having a queue of shortest length and transfers the boot request message M3 from the current entry of status management table 30 to the end of the shortest length queue and begins a timing action. By executing steps 226 and 227, the master computer 10 then determines whether a network boot complete message M6 is received from the remote computer of shortest waiting queue within the period of the timing action. If not, flow proceeds from step 227 to step 222. If the message M6 is received, flow proceeds from step 226 to step 228 to send a copy of the request message M3 to the remote computer of shortest waiting queue, and then flow returns to step 208 to repeat the above process for another computer if there is one. Therefore, when the available remote computers are all busy, the master computer 10 transmits a message M4 (i.e., network boot command signal) to the remote computer of the shortest length queue only when it receives a network boot complete message from the remote computer upon completion of a network boot process on a request waiting in a position of the shortest length queue preceding a position to which the request is transferred.

What is claimed is:

1. A computer network comprising:

a plurality of computers respectively identified by unique addresses and interconnected by a network, one of said computers being a master computer having an operating system (OS) management table for mapping said unique addresses to respective versions of all operating system, each of said computers being responsive to a network boot command signal for performing a network boot process to a source computer by transmitting thereto a copy of a selected version of the operating system, and retrieving a list of said operating system versions from said OS management table to allow a user to select one of the versions from the list and transmitting a request to the master computer indicating the selected version when functioning as said source computer, said master computer being responsive to said request for transmitting said network boot command signal to a third computer in which the selected version of the operating system is installed so that the third computer performs said network boot process by transmitting a copy of the selected version of the operating system to said source computer.

2. A computer network as claimed in claim 1, wherein said third computer transmits a network boot complete message to said master computer upon completion of the network boot process, and wherein said master computer further comprises a status table for mapping said unique addresses to respective busy/idle states of the computers and to respective queues, said master computer storing said request from the source computer into the queue or said third computer prior to the transmission of said network boot command signal, making a search through the OS management table for a plurality of remote computers in which the operating system of the selected version is installed if said network boot complete message is not returned from said third computer within a specified time interval, making a search through the status table to determine the busy/idle states of said plurality of remote computers and to detect one of the queues of said plurality of remote computers whose length is shortest if all of said plurality or remote computers are determined to be in a busy state, transferring said request to the queue of the shortest length, and transmitting said network boot command signal to the computer of the shortest length queue when the master computer receives a network boot complete message upon completion of a network boot process performed by the computer of the shortest length queue on a request waiting in a position of the shortest length queue preceding a position to which said request is transferred.

3. A computer network comprising:

a plurality of computers respectively identified by unique addresses and interconnected by a network, one of said computers being a master computer having an operating system (OS) management table for mapping said unique addresses to respective versions or an operating system and a status table for mapping said unique addresses to respective busy/idle states of the computers and to respective queues, each of said computers being responsive to a network boot command signal for performing a network boot process to a source computer by transmitting thereto a copy of a selected version of the operating system, transmitting a network boot complete message to the master computer upon completion of the network boot process, retrieving a list of said operating system versions from said OS management table to allow a user to select one of the versions from the list when functioning as said source computer, and transmitting a request to the master computer indicating the selected version, said master computer being responsive to said request for making a search through the OS management table for a plurality of remote computers in which the operating system of the selected version is installed, making a search through the status table to determine the busy/idle states of the remote computers and to detect one of the queues of said remote computers whose length is shortest if all of said remote computers are determined to be in a busy state, storing said request into the shortest length queue, and transmitting said network boot command signal indicating the selected version to the remote computer of the shortest length queue when the master computer receives a network boot complete message therefrom upon completion of a network boot process performed by the remote computer on an older request in the shortest length queue.

4. A computer network as claimed in claim 3, wherein said request contains the address of the source computer, said master computer transmitting a copy the request as said network boot command signal so that a recipient computer establishes the identity of said source computer.

5. A computer network as claimed in claim 3, wherein said request contains time-of-day data indicating time of day at which the request is sent front the source computer to the master computer, said master computer removing said request from the queue of one of said remote computers when the request is not served within a specified period from said time of day.

6. A method for starting a computer in a computer network which comprises a plurality of computers respectively identified by unique addresses, one of said computers being a master computer having an operating system (OS) management table for mapping said unique addresses to respective versions of an operating system, the method comprising the steps of:

a) retrieving a list of said operating system versions from said OS management table to allow a user at a source computer to select one of the versions from the list;

b) transmitting a request from the source computer to the master computer indicating the selected version;

c) responsive to said request for detecting a unique address, at said master computer, corresponding to the selected version and transmitting a network boot command signal from the master computer to a third computer identified by the unique address; and d) responsive to the network boot command signal for performing a network boot process at the third computer by transmitting therefrom a copy of the selected version of the operating system to said source computer.

7. A method as claimed in claim 6, wherein said master computer further comprises a status table for mapping said unique addresses to respective busy/idle states of the computers and to respective queues, further comprising the steps of:

e) transmitting from said third computer a network boot complete message to said master computer upon completion of the network boot process, and f) storing, at said master computer, said request from the source computer into the queue of said third computer prior to the transmission of said network boot command signal;

g) making a search through the OS management table for a plurality of remote computers in which the operating system of the selected version is installed if said network boot complete message is not returned from said third computer within a specified time interval;

h) making a search through the status table to determine the busy/idle states of said plurality of remote computers and to detect one of the queues of said plurality of remote computers whose length is shortest if all of said plurality of remote computers are determined to be in a busy state;

i) transferring said request from the queue of the step (f) to the queue of the shortest length detected by the step (h); and j) transmitting said network boot command signal to the computer of the shortest length queue from the master computer when the master computer receives a network boot complete message upon completion of a network boot process performed by the computer of the shortest length queue on a request waiting in a position of the shortest length queue preceding a position to which said request is transferred.

8. A method for starring a computer in a computer network comprising a plurality of computers respectively identified by unique addresses and interconnected by a network, one of said computers being a master computer having an operating system (OS) management table for mapping said unique addresses to respective versions of an operating system and a status table for mapping said unique addresses to respective busy/idle states of the computers and to respective queues, a) retrieving a list of said operating system versions from said OS management table to allow a user at a source computer to select one of the versions from the list, and transmitting from the source computer a request to the master computer indicating the selected version;

b) responsive to said request for making a search through the OS management table for a plurality of remote computers in which the operating system of the selected version is installed and making a search through the status table to determine the busy/idle states of the remote computers and to detect one of the queues of said remote computers whose length is shortest if all of said remote computers are determined to be in a busy state;

c) storing said request into the queue of the shortest length;

d) transmitting, from the master computer, a network boot command signal to the remote computer of the shortest length queue when the master computer receives therefrom a network boot complete message upon completion of a network boot process performed by the remote computer of the shortest queue length on an older request in the shortest length queue; and e) responsive to the network boot command signal transmitted by the step (d), transmitting from the remote computer of the shortest queue length a copy of the operating system of the selected version to said source computer.

* * * * *